United States Patent [19]

Mihara

[11] Patent Number: 5,678,173
[45] Date of Patent: Oct. 14, 1997

[54] CATV SYSTEM AND METHOD OF JUDGING MODULATION TECHNIQUE IN CATV SYSTEM

[75] Inventor: Yoshikazu Mihara, Kawanishi, Japan

[73] Assignee: Sanyo Electric Co., Ltd., Osaka, Japan

[21] Appl. No.: 442,989

[22] Filed: May 17, 1995

[30] Foreign Application Priority Data

May 19, 1994 [JP] Japan ................... 6-105747

[51] Int. Cl.$^6$ ................... H04N 5/46; H04N 7/14
[52] U.S. Cl. ................... 455/5.1; 455/6.1; 455/6.2; 348/10; 348/12; 348/555
[58] Field of Search ................... 348/554, 555, 348/556, 557, 558, 6, 12, 10, 13; 455/3.1, 3.2, 4.1, 5.1, 6.1, 6.2; H04N 5/46

[56] References Cited

U.S. PATENT DOCUMENTS 5,083,205  1/1992  Arai ................................ 348/555
5,355,162  10/1994  Yazolino et al. ................. 348/12 X Primary Examiner—John K. Peng
Assistant Examiner—Nathan J. Flynn
Attorney, Agent, or Firm—Nikaido, Marmelstein, Murray & Oram LLP

[57] ABSTRACT

The present invention is directed to a CATV system in which a broadcasting multiple signal including a plurality of types of broadcasting signals modulated by at least two different modulation techniques is sent to a CATV terminal device from a CATV broadcasting device. In the CATV terminal device, the broadcasting signal corresponding to a requested channel is selected from the sent broadcasting multiple signal. The selected broadcasting signal is sent to a plurality of types of demodulation means respectively corresponding to the modulation techniques. The modulation technique by which the broadcasting signal corresponding to the requested channel is modulated is judged on the basis of data representing the relationship between each of channels sent from the CATV broadcasting device and the modulation technique by which the broadcasting signal corresponding to the channel is modulated. An output of the demodulating means corresponding to the judged modulation technique is selected out of outputs of the plurality of types of demodulating means.

8 Claims, 3 Drawing Sheets

CATV SYSTEM AND METHOD OF JUDGING MODULATION TECHNIQUE IN CATV SYSTEM

BACKGROUND OF THE INVENTION

1. Field of the Invention

The present invention relates to a CATV (Cable Television) system in which a broadcasting multiple signal including a plurality of types of broadcasting signals modulated by at least two different modulation techniques is sent to a CATV terminal device from a CATV broadcasting device and a method of judging a modulation technique in a CATV system.

2. Description of the Prior Art

Examples of a method of judging, when a broadcasting signal modulated by an analog modulation technique and a broadcasting signal modulated by a digital modulation technique are sent to a receiving device as a mixture, a modulation technique by which the broadcasting signal selected by a tuner is modulated include a method disclosed in Japanese Patent Laid-Open Gazette No. 347736/1993.

In this conventional method, the broadcasting signal selected by the tuner is sent to both an analog modulated wave demodulator and a digital modulated wave demodulator. A digital modulated wave judging circuit judges whether or not an output signal of the digital modulated wave demodulator is normal. If the output signal is normal, it is judged that the broadcasting signal selected by the tuner is a digital modulated wave.

The judgment as to whether the output signal of the digital modulated wave demodulator is normal is made in the following manner. A synchronous word is periodically inserted into an image or voice data sequence digitally coded. When the synchronous word is detected from the output signal of the digital modulated wave demodulator, it is judged that the broadcasting signal selected by the tuner is a digital modulated wave.

In the above described conventional method, a digital modulated wave judging circuit for judging whether or not the output signal of the digital modulated wave demodulator is normal is required, whereby the construction of the receiving device becomes complicated, and the cost thereof rises.

SUMMARY OF THE INVENTION

An object of the present invention is to provide a CATV system capable of simply judging a modulation technique by which a broadcasting signal corresponding to a requested channel is modulated so that the construction of a CATV terminal device is simplified and a method of judging modulation technique in a CATV system.

In a CATV system in which a broadcasting multiple signal including a plurality of types of broadcasting signals modulated by at least two different modulation techniques is sent to a CATV terminal device from a CATV broadcasting device, a first CATV system according to the present invention is characterized in that the CATV terminal device comprises channel selecting means for selecting the broadcasting signal corresponding to a requested channel from the sent broadcasting multiple signal, a plurality of types of demodulating means for demodulating the broadcasting signal selected by the channel selecting means by each of demodulation techniques corresponding to the modulation techniques, storing means for storing data representing the relationship between each of channels sent from the CATV broadcasting device and the modulation technique by which the broadcasting signal corresponding to the channel is modulated, judging means for judging the modulation technique by which the broadcasting signal corresponding to the requested channel is modulated on the basis of the data from the storing means, and output selecting means for selecting an output of the demodulating means corresponding to the modulation technique judged by the judging means out of outputs of the demodulating means.

In a CATV system in which a broadcasting multiple signal including a plurality of types of broadcasting signals modulated by at least two different modulation techniques is sent out to a relay device from a CATV broadcasting device, and a broadcasting signal corresponding to a requested channel in the broadcasting multiple signal sent to the relay device is sent to a CATV terminal device, a second CATV system according to the present invention is characterized in that the CATV terminal device comprises a plurality of types of demodulating means for demodulating the sent broadcasting signal by each of demodulation techniques corresponding to the modulation techniques, storing means for storing data representing the relationship between each of channels sent from the CATV broadcasting device and the modulation technique by which the broadcasting signal corresponding to the channel is modulated, judging means for judging the modulation technique by which the broadcasting signal corresponding to the requested channel is modulated on the basis of the data from the storing means, and output selecting means for selecting an output of the demodulating means corresponding to the modulation technique judged by the judging means out of outputs of the demodulating means.

In a CATV system in which a broadcasting multiple signal including a plurality of types of broadcasting signals modulated by at least two different modulation techniques is sent to a CATV terminal device from a CATV broadcasting device, a third CATV system according to the present invention is characterized in that the CATV terminal device comprises channel selecting means for selecting the broadcasting signal corresponding to a requested channel from the sent broadcasting multiple signal, a plurality of types of demodulating means for demodulating the broadcasting signal selected by the channel selecting means by each of demodulation techniques corresponding to the modulation techniques, judging means for judging the modulation technique by which the broadcasting signal corresponding to the requested channel is modulated by inquiring the CATV broadcasting device of the modulation technique by which the broadcasting signal selected by the channel selecting means is modulated, and output selecting means for selecting an output of the demodulating means corresponding to the modulation technique judged by the judging means out of outputs of the demodulating means.

In a CATV system in which a broadcasting multiple signal including a plurality of types of broadcasting signals modulated by at least two different modulation techniques is sent out to a relay device from a CATV broadcasting device, and the broadcasting signal corresponding to a requested channel in the broadcasting multiple signal sent to the relay device is sent to a CATV terminal device, a fourth CATV system according to the present invention is characterized in that the CATV terminal device comprises a plurality of types of demodulating means for demodulating the sent broadcasting signal by each of demodulation techniques corresponding to the modulation techniques, judging means for judging the modulation technique by which the broadcasting signal corresponding to the requested channel is modulated by inquiring the CATV broadcasting device of the modulation technique by which the broadcasting signal corresponding to the requested channel is modulated, and output selecting means for selecting an output of the demodulating means corresponding to the modulation technique judged by the judging means out of outputs of the demodulating means.

In a method of judging a modulation technique in a CATV system in which a broadcasting multiple signal including a plurality of types of broadcasting signals modulated by at least two different modulation techniques is sent to a CATV terminal device from a CATV broadcasting device, the CATV terminal device judges the modulation technique by which the broadcasting signal corresponding to a requested channel is modulated and demodulates the broadcasting signal corresponding to the requested channel by a demodulation technique corresponding to the judged modulation technique, a first method of judging a modulation technique in a CATV system according to the present invention is characterized by comprising the step of judging the modulation technique by which the broadcasting signal corresponding to the requested channel is modulated on the basis of data representing the relationship between each of channels sent from the CATV broadcasting device and the modulation technique by which the broadcasting signal corresponding to the channel is modulated.

In a method of judging a modulation technique in a CATV system in which a broadcasting multiple signal including a plurality of types of broadcasting signals modulated by at least two different modulation techniques is sent out to a relay device from a CATV broadcasting device, the broadcasting signal corresponding to a requested channel in the broadcasting multiple signal sent to the relay device is sent to a CATV terminal device, the CATV terminal device judges the modulation technique by which the broadcasting signal corresponding to the requested channel is modulated and demodulates the broadcasting signal corresponding to the requested channel by a demodulation technique corresponding to the judged modulation technique, a second method of judging a modulation technique in a CATV system according to the present invention is characterized by comprising the step of judging the modulation technique by which the broadcasting signal corresponding to the requested channel is modulated on the basis of data representing the relationship between each of channels sent from the CATV broadcasting device and the modulation technique by which the broadcasting signal corresponding to the channel is modulated.

In a method of judging a modulation technique in a CATV system in which a broadcasting multiple signal including a plurality of types of broadcasting signals modulated by at least two different modulation techniques is sent to a CATV terminal device from a CATV broadcasting device, the CATV terminal device judges the modulation technique by which the broadcasting signal corresponding to a requested channel is modulated and demodulates the broadcasting signal corresponding to the requested channel by a demodulation technique corresponding to the judged modulation technique, a third method of judging a modulation technique in a CATV system according to the present invention is characterized by comprising the step of judging the modulation technique by which the broadcasting signal corresponding to the requested channel is modulated by inquiring the CATV broadcasting device of the modulation technique by which the broadcasting signal corresponding to the requested channel is modulated.

In a method of judging a modulation technique in a CATV system in which a broadcasting multiple signal including a plurality of types of broadcasting signals modulated by at least two different modulation techniques is sent out to a relay device from a CATV broadcasting device, the broadcasting signal corresponding to a requested channel in the broadcasting multiple signal sent to the relay device is sent to a CATV terminal device, the CATV terminal device judges the modulation technique by which the broadcasting signal corresponding to the requested channel is modulated and demodulates the broadcasting signal corresponding to the requested channel by a demodulation technique corresponding to the judged modulation technique, a fourth method of judging a modulation technique in a CATV system according to the present invention is characterized by comprising the step of judging the modulation technique by which the broadcasting signal corresponding to the requested channel is modulated by inquiring the CATV broadcasting device of the modulation technique by which the broadcasting signal corresponding to the requested channel is modulated.

According to the present invention, the modulation technique by which the broadcasting signal corresponding to the requested channel is modulated can be simply judged, so that the construction of the CATV terminal device is simplified.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
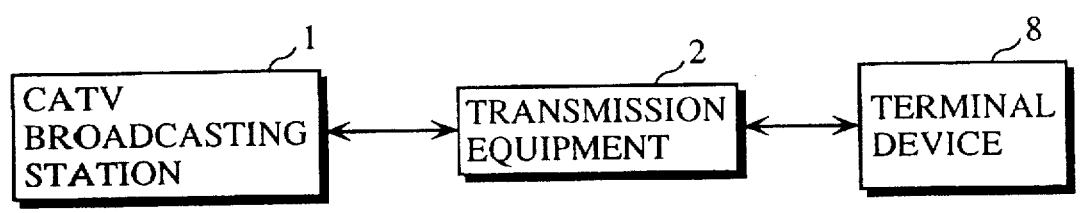
FIG. 1 is a block diagram showing the entire construction of a two-way communication CATV system.

FIG. 1 illustrates the entire construction of a two-way communication CATV system.

This system comprises a CATV broadcasting station 1, a transmission equipment 2, and a CATV terminal device 3.

Figure 2:
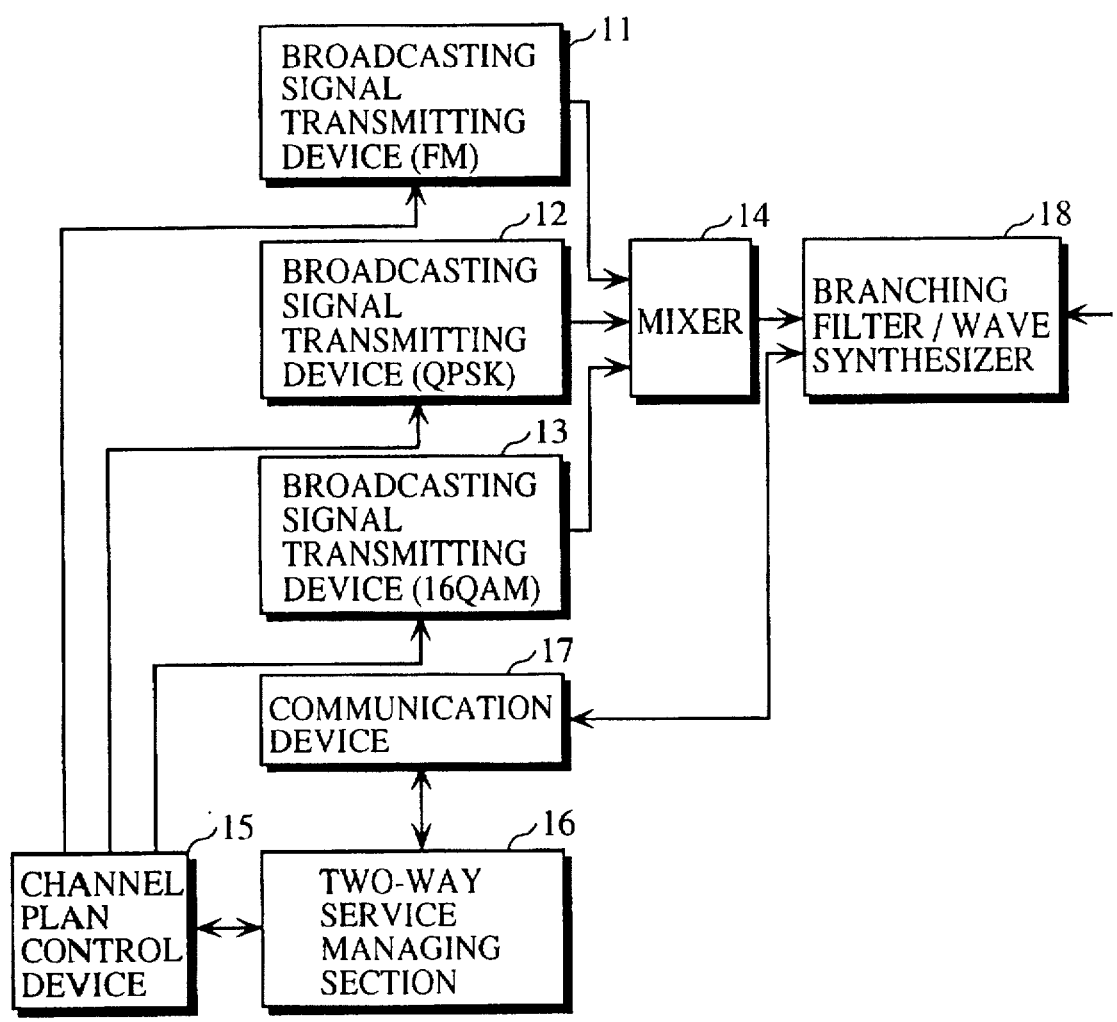
FIG. 2 is a block diagram showing the construction of a CATV broadcasting station.

FIG. 2 illustrates the construction of the CATV broadcasting station 1.

The CATV broadcasting station 1 comprises three broadcasting signal transmitting devices 11, 12 and 13, a mixer 14, a channel plan control device 15, a two-way service managing section 16, a communication device 17, and a branching filter/wave synthesizer 18.

The first broadcasting signal transmitting device 11 respectively transmits broadcasting signals corresponding to a plurality of channels modulated by FM (Frequency Modulation) which is one type of analog modulation technique. The second broadcasting signal transmitting device 12 respectively transmits broadcasting signals corresponding to a plurality of channels modulated by quadrature phase shift keying (QPSK) which is one type of digital modulation technique. The third broadcasting signal transmitting device 13 respectively transmits broadcasting signals corresponding to a plurality of channels modulated by quadrature amplitude modulation (16 QAM) which is one type of digital modulation technique.

The mixer 14 frequency multiplexes the broadcasting signals respectively transmitted from the broadcasting signal transmitting devices 11, 12 and 13. A signal obtained by frequency multiplexing the broadcasting signals by the mixer 14 shall be called a broadcasting multiple signal.

The channel plan control device 15 assigns channels to the respective broadcasting signals. For convenience of illustration, it is assumed that 10 broadcasting signals corresponding to channels "1" to "10" are sent out from the first broadcasting signal transmitting device 11, 10 broadcasting signals corresponding to channels "11" to "20" are sent out from the second broadcasting signal transmitting device 12, and 10 broadcasting signals corresponding to channels "21" to "30" are sent out from the third broadcasting signal transmitting device 13.

The two-way service managing section 16 manages a two-way service. The communication device 17 transmits and receives control data concerning the two-way service. The control data transmitted from the communication device 17 include data representing the relationship between each of the channels and a modulation technique by which a broadcasting signal corresponding to the channel is modulated (hereinafter referred to as control data for judging a modulation technique). The control data for judging a modulation technique is produced on the basis of the assignment of the channels by the channel plan control device 15. The control data for judging a modulation technique is sent out when the CATV terminal device 3 is installed, and is sent out to the CATV terminal device 3 every time a channel plan is changed.

The branching filter/wave synthesizer 18 syntheses the broadcasting multiple signal and the control data. A signal obtained by the synthesis is sent to the CATV terminal device 3 through the transmission equipment 2. Control data sent to the branching filter/wave synthesizer 18 through the transmission equipment 2 from the CATV terminal device 3 is sent to the two-way service managing section 16 through the communication device 17.

Figure 3:
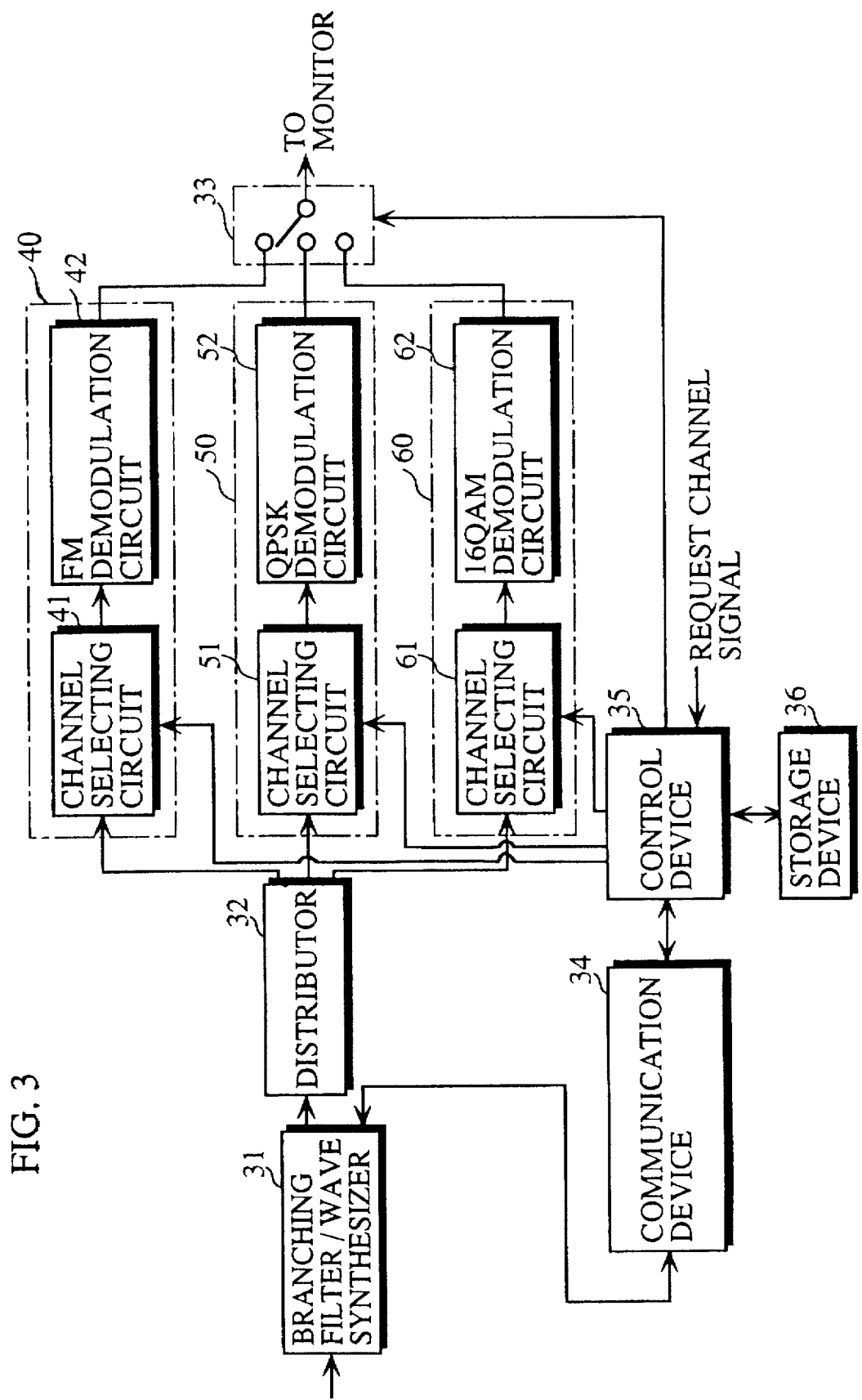
FIG. 3 is a block diagram showing the construction of a CATV terminal device.

FIG. 3 illustrates the construction of the CATV terminal device 3.

The CATV terminal device 3 comprises a branching filter/wave synthesizer 31, a distributor 32, three tuner blocks 40, 50 and 60, a switch 33, a communication device 34, and a control device 35.

The branching filter/wave synthesizer 31 separates the broadcasting multiple signal and the control data which are sent from the CATV broadcasting station 1. The control data from the CATV broadcasting station 1 which is outputted from the branching filter/wave synthesizer 31 is sent to the control device 35 through the communication device 34. In addition, control data to be sent to the CATV broadcasting station 1 which is produced by the control device 35 is sent to the CATV broadcasting station 1 through the communication equipment 34, the branching filter/wave synthesizer 31, and the transmission equipment 2.

The broadcasting multiple signal outputted from the branching filter/wave synthesizer 31 is sent to the distributor 32. The distributor 32 distributes the inputted broadcasting multiple signal among the three tuner blocks 40, 50 and 60.

The first tuner block 40 comprises a channel selecting circuit 41 for extracting a broadcasting signal corresponding to a requested channel and an FM demodulation circuit 42 for demodulating an FM wave. The second tuner block 50 comprises a channel selecting circuit 51 for extracting a broadcasting signal corresponding to a requested channel and a QPSK demodulation circuit 52 for demodulating a signal modulated by the QPSK. The third tuner block 60 comprises a channel selecting circuit 61 for extracting a broadcasting signal corresponding to a requested channel and a 16 QAM demodulation circuit 62 for demodulating a signal modulated by the 16 QAM.

Outputs of the tuner blocks 40, 50 and 60 are respectively sent to the switch 33. An output of the switch 33 is sent to a television monitor. The switch 33 is controlled by the control device 35.

The control device 35 comprises a storage device 36. The newest control data for judging a modulation technique which is sent from the CATV broadcasting station 1 is stored in the storage device 36. A request channel signal representing a channel requested by a remote controller (not shown) or the like is inputted to the control device 35.

Description is made of operations performed by the CATV terminal device 3 in a case where the channels are switched.

If the channels are switched, the control device 35 judges the modulation technique by which the broadcasting signal corresponding to the requested channel is modulated on the basis of the control data for judging a modulation technique which is stored in the storage device 36. The control device 35 controls the switch 33 so as to select the output of the tuner block comprising the demodulation circuit corresponding to the judged modulation technique out of the three tuner blocks 40, 50 and 60. In addition, the control-device 35 sends a control signal corresponding to the requested channel to each of the channel selecting circuits 41, 51 and 61 in the respective tuner blocks 40, 50 and 60.

The channel selecting circuits 41, 51 and 61 respectively extract the broadcasting signals corresponding to the requested channels from the broadcasting multiple signal on the basis of the control signal from the control device 35. The extracted broadcasting signals are respectively sent to the demodulation circuits 42, 52 and 62 in the subsequent stages. In one, which corresponds to the modulation technique by which the inputted broadcasting signal is modulated, of the demodulation circuits 42, 52 and 62, normal demodulation is performed. A signal obtained by normally demodulating the inputted broadcasting signal is sent to the television monitor through the switch 33.

For example, it is assumed that the channel "25" is requested. The broadcasting signal corresponding to the channel "25" is a signal modulated by the QPSK. The control device 35 judges that the modulation technique by which the broadcasting signal corresponding to the requested channel "25" is modulated is the QPSK on the basis of the control data for judging a modulation technique which is stored in the storage device 36.

In this case, therefore, the switch 33 is so switched as to select an output of the second tuner block 50 comprising the QPSK modulation circuit 52. The channel selecting circuit 51 in the second tuner block 50 extracts the broadcasting signal corresponding to the channel "25" on the basis of the control signal corresponding to the channel "25" sent from the control device 35. The extracted broadcasting signal corresponding to the channel "25" is normally demodulated by the QPSK modulation circuit 52, and then is sent to the television monitor through the switch 33.

When the modulation technique by which the broadcasting signal corresponding to the requested channel is modulated is judged, the switch 33 may be controlled, and the power sources of the tuner blocks other than the tuner block corresponding to the judged modulation technique may be turned off.

Furthermore, when the requested channel is switched, the modulation technique by which the broadcasting signal corresponding to the requested channel is modulated may be judged by inquiring the CATV broadcasting station 1 of the modulation technique by which the broadcasting signal corresponding to the requested channel is modulated by the control device 35.

Additionally, the broadcasting signal corresponding to the requested channel may be extracted by a single channel selecting device from the broadcasting multiple signal outputted from the branching filter/wave synthesizer 31 in the CATV terminal device 3, to distribute the extracted broadcasting signal corresponding to the requested channel among the three demodulation circuits 42, 52 and 63. In such a case, one channel selecting device is sufficient.

It goes without saying that the present invention is also applicable to a two-way communication CATV system of a demand access type in which a relay device such as a hub is provided between a CATV broadcasting station 1 and a CATV terminal device 3. In such a two-way communication CATV system of a demand access type, a request channel signal is sent to the relay device from the CATV terminal device, and a broadcasting signal selected in correspondence to the request channel signal is sent to the CATV terminal device from the relay device.

In such a two-way communication CATV system of a demand access type, when channels are switched, a modulation technique by which the broadcasting signal corresponding to the requested channel is modulated may be judged by inquiring the relay device of the modulation technique by which the broadcasting signal corresponding to the requested channel is modulated.

Although description was made of the two-way communication CATV system, the present invention is also applicable to a one-way communication CATV system in which control data is transmitted only in one direction from a CATV broadcasting station to a CATV terminal device. In such a one-way communication CATV system, control data for judging a modulation technique which is sent from the CATV broadcasting station is stored in the CATV terminal device, and a modulation technique by which a broadcasting signal corresponding to a requested channel is modulated is judged on the basis of the stored control data for judging a modulation technique.

The present invention is applicable to a CATV system, provided that a multiple signal including broadcasting signals modulated by two or more different modulation techniques is sent out from a CATV broadcasting station. Further, it goes without saying that the content and a combination of two or more different modulation techniques are not limited to those in the above described embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a CATV system in which a broadcasting multiple signal including a plurality of types of broadcasting signals modulated by at least two different modulation techniques is sent to a CATV terminal device from a device upstream of said CATV terminal device, said CATV terminal device comprising:

channel selecting means for selecting a broadcasting signal corresponding to a requested channel from the broadcasting multiple signal;

a plurality of types of demodulating means for demodulating the broadcasting signal selected by said channel selecting means by each of demodulation techniques corresponding to said modulation techniques;

storing means for storing data sent from said device upstream of said CATV terminal device and representing the relationship between each of channels and the modulation technique by which the broadcasting signal corresponding to the channel is modulated;

judging means for judging the modulation technique by which the broadcasting signal corresponding to the requested channel is modulated is selected on the basis of the data from said storing means; and output selecting means for selecting an output of the demodulating means corresponding to the modulation technique judged by said judging means out of outputs of said demodulating means.

2. In a CATV system in which a broadcasting multiple signal including a plurality of types of broadcasting signals modulated by at least two different modulation techniques is sent out to a relay device from a CATV broadcasting device, and a broadcasting signal corresponding to a requested channel in the broadcasting multiple signal sent to the relay device is sent to a CATV terminal device, said CATV terminal device comprising:

a plurality of types of demodulating means for demodulating the sent broadcasting signal by each of demodulation techniques corresponding to said modulation techniques;

storing means for storing data sent from said CATV broadcasting device and representing the relationship between each of channels and the modulation technique by which the broadcasting signal corresponding to the channel is modulated;

judging means for judging the modulation technique by which the broadcasting signal corresponding to the requested channel is modulated on the basis of the data from said storing means; and output selecting means for selecting an output of the demodulating means corresponding to the modulation technique judged by said judging means out of outputs of said demodulating means.

3. In a CATV system in which a broadcasting multiple signal including a plurality of types of broadcasting signals modulated by at least two different modulation techniques is sent to a CATV terminal device from a device upstream of said CATV terminal device, said CATV terminal device comprising:

channel selecting means for selecting the broadcasting signal corresponding to a requested channel from the sent broadcasting multiple signal;

a plurality of types of demodulating means for demodulating the broadcasting signal selected by said channel selecting means by each of demodulation techniques corresponding to the modulation techniques;

judging means for judging the modulation technique by which the broadcasting signal corresponding to the requested channel is modulated by inquiring of said device in the upstream of said CATV terminal device about the modulation technique by which the broadcasting signal selected by said channel selecting means is modulated; and output selecting means for selecting an output of the demodulating means corresponding to the modulation technique judged by said judging means out of outputs of said demodulating means.

4. In a CATV system in which a broadcasting multiple signal including a plurality of types of broadcasting signals modulated by at least two different modulation techniques is sent out to a relay device from a CATV broadcasting device, and the broadcasting signal corresponding to a requested channel in the broadcasting multiple signal sent to the relay device is sent to a CATV terminal device, said CATV terminal device comprising:

a plurality of types of demodulating means for demodulating the sent broadcasting signal by each of demodulation techniques corresponding to said modulation techniques;

judging means for judging the modulation technique by which the broadcasting signal corresponding to the requested channel is modulated by inquiring of said CATV broadcasting device about the modulation technique by which the broadcasting signal corresponding to the requested channel is modulated; and output selecting means for selecting an output of the demodulating means corresponding to the modulation technique judged by said judging means out of outputs of said demodulating means.

5. In a method of judging a modulation technique in a CATV system in which a broadcasting multiple signal including a plurality of types of broadcasting signals modulated by at least two different modulation techniques is sent to a CATV terminal device from a device upstream of said CATV terminal device, the CATV terminal device judges the modulation technique by which the broadcasting signal corresponding to a requested channel is modulated and demodulates the broadcasting signal corresponding to the requested channel by a demodulation technique corresponding to the judged modulation technique, the method comprising the step of judging the modulation technique by which the broadcasting signal corresponding to the requested channel is modulated on the basis of data sent to said CATV terminal device from said device upstream of said CATV terminal device, stored in said storing means provided in said CATV terminal device and representing the relationship between each of channels and the modulation technique by which the broadcasting signal corresponding to the channel is modulated.

6. In a method of judging a modulation technique in a CATV system in which a broadcasting multiple signal including a plurality of types of broadcasting signals modulated by at least two different modulation techniques is sent out to a relay device from a CATV broadcasting device, the broadcasting signal corresponding to a requested channel in the broadcasting multiple signal sent to the relay device is sent to a CATV terminal device, the CATV terminal device judges the modulation technique by which the broadcasting signal corresponding to the requested channel is modulated and demodulates the broadcasting signal corresponding to the requested channel by a demodulation technique corresponding to the judged modulation technique, the method comprising the step of judging the modulation technique by which the broadcasting signal corresponding to the requested channel is modulated on the basis of data sent to said CATV terminal device from said CATV broadcasting device stored in a storing means provided in said CATV terminal device and representing the relationship between each of channels and the modulation technique by which the broadcasting signal corresponding to the channel is modulated.

7. In a method of judging a modulated technique in a CATV system in which a broadcasting multiple signal including a plurality of types of broadcasting signals modulated by at least two different modulation techniques is sent to a CATV terminal device from a device in the upstream of said CATV terminal device, the CATV terminal device judges the modulation technique by which the broadcasting signal corresponding to a requested channel is modulated and demodulates the broadcasting signal corresponding to the requested channel by a demodulation technique corresponding to the judged modulation technique, the method comprising the step of judging the modulation technique by which the broadcasting signal corresponding to the requested channel is modulated by inquiring of said device in the upstream of said CATV terminal device about the modulation technique by which the broadcasting signal corresponding to the requested channel is modulated.

8. In a method of judging a modulation technique in a CATV system in which a broadcasting multiple signal including a plurality of types of broadcasting signals modulated by at least two different modulation techniques is sent out to a relay device from a CATV broadcasting device, the broadcasting signal corresponding to a requested channel in the broadcasting multiple signal sent to the relay device is sent to a CATV terminal device, the CATV terminal device judges the modulation technique by which the broadcasting signal corresponding to the requested channel is modulated and demodulates the broadcasting signal corresponding to the requested channel by a demodulation technique corresponding to the judged modulation technique, the method comprising the step of judging the modulation technique by which the broadcasting signal corresponding to the requested channel is modulated by inquiring of said CATV broadcasting device about the modulation technique by which the broadcasting signal corresponding to the requested channel is modulated.

* * * * *